(12) United States Patent
Rallis et al.

(10) Patent No.: US 6,189,099 B1
(45) Date of Patent: Feb. 13, 2001

(54) NOTEBOOK SECURITY SYSTEM (NBS)

(75) Inventors: William N. Rallis, Framingham; Yaacov Behar, Winchester, both of MA (US)

(73) Assignee: Durango Corporation, Framingham, MA (US)

(*) Notice: Under 35 U.S.C. 154(b), the term of this patent shall be extended for 0 days.

(21) Appl. No.: 09/022,088

(22) Filed: Feb. 11, 1998

(51) Int. Cl.[7] ............................. H04L 9/32; G06F 12/14
(52) U.S. Cl. ........................................ 713/172; 713/202
(58) Field of Search .................................. 713/159, 168, 713/170, 172, 173, 183, 185, 202; 705/72

(56) References Cited

U.S. PATENT DOCUMENTS

| | | | |
|---|---|---|---|
| 4,789,859 | 12/1988 | Clarkson et al. | 340/825.31 |
| 4,937,437 | 6/1990 | Ferguson | 235/382 |
| 4,975,550 | 12/1990 | Panchisin | 200/43.08 |
| 4,993,627 | 2/1991 | Phelan et al. | 235/382 |
| 5,012,514 | 4/1991 | Renton | 380/4 |
| 5,072,101 | 12/1991 | Ferguson | 235/441 |
| 5,077,991 | 1/1992 | Stickel et al. | 70/58 |
| 5,142,269 | 8/1992 | Mueller | 340/568 |
| 5,265,163 | 11/1993 | Golding et al. | 380/25 |

(List continued on next page.)

OTHER PUBLICATIONS

Wiener, P. et al., "Meeting USP and IEEE 1394 Overcurrent Protection Requirements Using PolySwitch Devices," Wescon/97 Conf. Proc., Nov. 6, 1997, pp. 442–475.*

SecurityPak—Complete Computer Security Solution, found at <http://acan.net/~portapak/securitypak.html> (Jan. 13, 1998).

M–Crypt—The Ideal in Laptop and Desktop Protection, found at <http://www.secure–data.com/ip/mcrypt/mcrypt.html> (Jan. 13, 1998).

SafeHouse for Windows, found at <http://www.pcdynamics.com/SafeHouse/startpage.html> (Jan. 13, 1998).

Are Smartcards a Certificate Solution?, found at <http://www.byte.com/art/9706/sec5/art4.htm> (Feb. 4, 1998).

Serial Cable with Security Key, found at <http://www.scintco.com/skey1.htm> (Feb. 4, 1998).

EY–LOK II dongle security devices, found at <http://www.keylok.com/> (Feb. 4, 1998).

SecuriKey For PC's, found at <http://www.datasec.com/SecruPC.htm> (Feb. 4, 1998).

blu Venom Anti–Theft Devices Inc., found at <http://www.bluvenom. com/body_home.html> (Feb. 2, 1998).

EliaShim releases EasySafe Version 3.1 To Secure Data on DOS/Windows & Windows 95 Laptops, found at <http://www.virussafe.com/presel/pr0907.html> (Jan. 13, 1998).

*Primary Examiner*—Todd R. Swann
*Assistant Examiner*—Justin T. Darrow
(74) *Attorney, Agent, or Firm*—Cesari and McKenna, LLP

(57) ABSTRACT

A computer security system is described. Each authorized user is provided with a key device that holds a serial number and an encryption key. A validation record stored on the computer's hard disk contains an unencrypted key device serial number and an encrypted hard disk serial number. The user connects the key device to the computer prior to power-up or reset. A program implements a user validation procedure. The procedure permits entry past a first security level if the key device serial number matches the unencrypted number in the validation record. If the first level validation is successful, the procedure then uses the encryption key to decrypt the hard drive serial number found in the stored validation record. The procedure permits entry past a second security level if the validation record is properly decrypted and the hard disk serial number matches the decrypted number. Failure in any step powers down the computer and renders it useless.

10 Claims, 10 Drawing Sheets

U.S. PATENT DOCUMENTS

| | | | |
|---|---|---|---|
| 5,287,408 | 2/1994 | Samson | 380/4 |
| 5,341,421 | 8/1994 | Ugon | 380/4 |
| 5,361,610 | 11/1994 | Sanders | 70/14 |
| 5,367,295 | 11/1994 | Gokcebay et al. | 340/825.31 |
| 5,402,492 | 3/1995 | Goodman et al. | 380/25 |
| 5,416,840 * | 5/1995 | Cane et al. | 380/4 |
| 5,450,271 | 9/1995 | Fukushima et al. | 361/686 |
| 5,461,218 | 10/1995 | Castleman et al. | 235/382 |
| 5,475,839 | 12/1995 | Watson et al. | 395/650 |
| 5,499,297 | 3/1996 | Boebert | 380/23 |
| 5,517,569 | 5/1996 | Clark | 380/52 |
| 5,533,125 | 7/1996 | Bensimon et al. | 380/4 |
| 5,542,044 | 7/1996 | Pope | 385/186 |
| 5,546,463 | 8/1996 | Caputo et al. | 380/25 |
| 5,548,479 | 8/1996 | Hyvarinen | 361/684 |
| 5,568,552 | 10/1996 | Davis | 380/4 |
| 5,572,193 * | 11/1996 | Flanders et al. | 340/825.34 |
| 5,587,878 | 12/1996 | Tsai et al. | 361/683 |
| 5,588,059 * | 12/1996 | Chandos et al. | 380/21 |
| 5,598,323 | 1/1997 | Muller | 361/726 |
| 5,603,008 | 2/1997 | Hilton et al. | 395/491 |
| 5,606,615 | 2/1997 | Lapointe et al. | 380/25 |
| 5,608,387 | 3/1997 | Davies | 340/825.34 |
| 5,610,981 | 3/1997 | Mooney et al. | 380/25 |
| 5,623,637 | 4/1997 | Jones et al. | 395/491 |
| 5,642,805 | 7/1997 | Tefft | 200/43.08 |
| 5,651,068 | 7/1997 | Klemba et al. | 380/25 |
| 5,657,470 | 8/1997 | Fisherman et al. | 395/480 |
| 5,732,137 * | 3/1998 | Aziz | 380/25 |
| 5,867,106 * | 2/1999 | Bi et al. | 340/825.31 |

* cited by examiner

NOTEBOOK SECURITY SYSTEM (NBS)

BACKGROUND OF THE INVENTION

Theft is a serious and expensive problem for the users of notebook, or laptop, computers. It has been estimated that over a quarter of a million notebook computers are stolen each year, and a majority of business firms report losses from notebook computer theft. In addition to the value of the hardware, users may also suffer the loss of data stored on the computers. Conventional methods for protecting computer hardware consist of either physically isolating the computer in a locked room or mechanically securing the computer to a fixed object. However, such devices are cumbersome to use and defeat the mobility of the notebook computer.

There are notebook computer security systems that electronically track a computer and sound an alarm when it is moved a certain distance from the user. However, users will often disarm such security features because they restrict personal movement, and passersby will typically ignore audible alarms and similar warning devices. Another security system is a password program that directs the computer to secretly dial a security company when an improper password is entered. The security company uses the caller ID feature to locate the computer. This system may be defeated by intercepting the outgoing call. Other security devices, such as "smart cards" and dongles, are also available, but these devices are designed for the protection of data and not for the deterrence of theft of computers.

Therefore, what is needed is an easy-to-use and low cost security system to deter the theft of a notebook computer.

SUMMARY OF THE INVENTION

Briefly, a security system constructed in accordance with the invention implements a user-validation procedure that requires the user to install the proper hardware "key" device at boot-up to enable operation of a computer. The system can support multiple users and a single supervisor. Each authorized user is provided with a unique key device which is carried and stored separately from the computer. The key device holds a unique serial number and an encryption key. A validation record stored on the computer's hard disk contains an unencrypted key device serial number and an encrypted hard disk serial number.

A program that is automatically invoked at computer power-up, or reset, implements the user-validation procedure. The user is prompted to connect the key device to the computer. There is no manual password entry. The procedure permits entry past a first security level only if the key device serial number matches the unencrypted number in the validation record. If the first-level validation is successful, the procedure then uses the encryption key to decrypt the hard drive serial number found in the stored validation record. The procedure permits entry past the second security level only if the validation record is properly decrypted and the actual hard disk serial number matches the decrypted number. A failure at any step in the user-validation procedure will immediately power down the computer, thereby rendering it useless to a thief not possessing the required key device.

Because the key device is not required for normal computer operations, after the user-validation procedure has successfully terminated, the user can remove the key device and keep it separate from the computer. Moreover, the small size of the key device makes it easy to transport and keep safe.

BRIEF DESCRIPTION OF THE DRAWINGS

The above and further advantages of the invention may be better understood by referring to the following description in conjunction with the accompanying drawing, in which.

DETAILED DESCRIPTION OF AN ILLUSTRATIVE EMBODIMENT

Figure 1A:
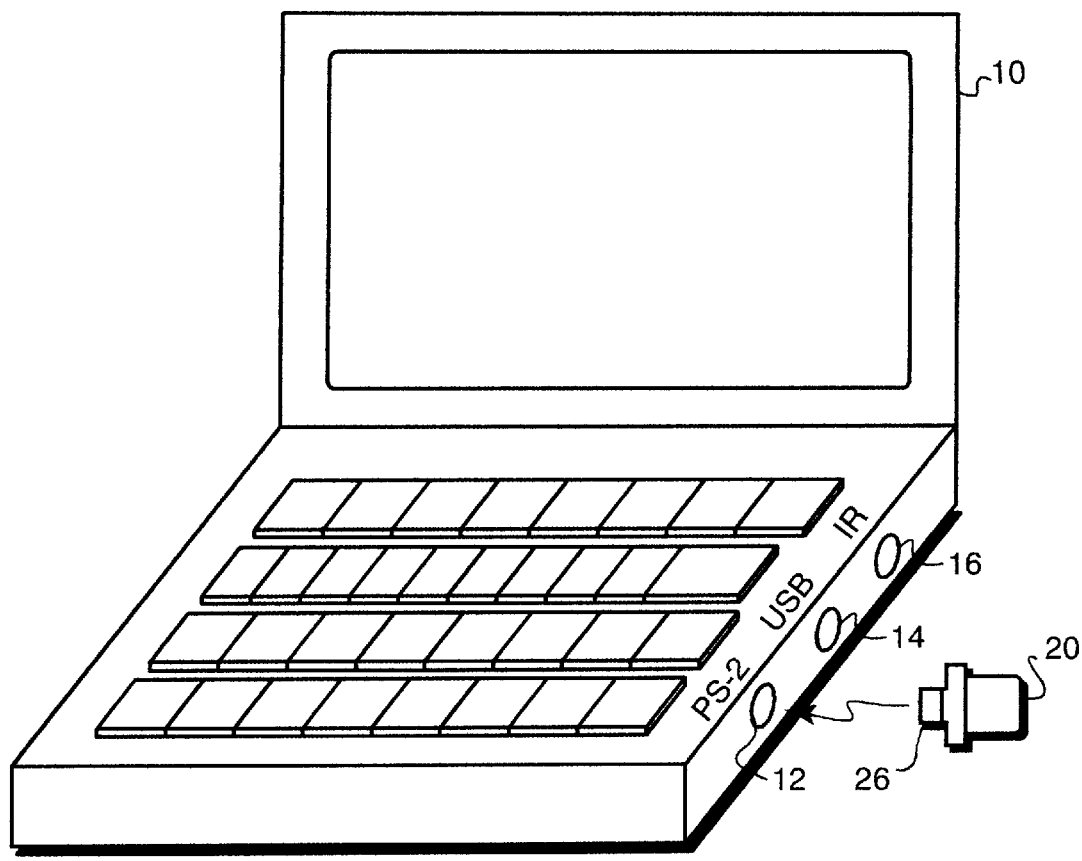
FIG. 1A is an illustration of the Notebook Security System (NBS)
Figure 1B:
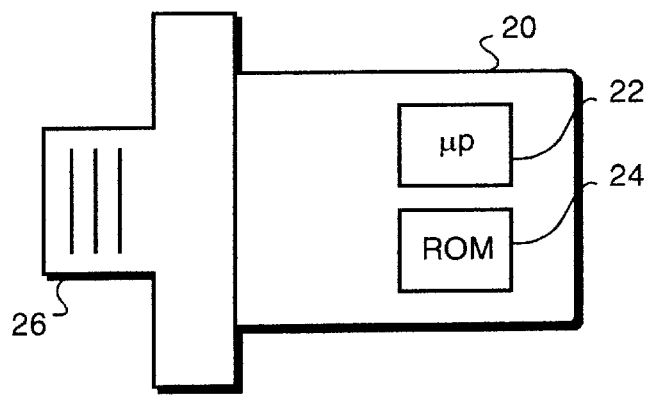
FIG. 1B is an illustration of a key device.

FIG. 1A shows a key device 20 connected to a notebook computer 10. The key device 20, shown in FIG. 1B, has no external controls and is comprised of a microcomputer 22, a read-only-memory 24 and a connector 26. The connector 26 may attach to is one of the I/O ports on the notebook computer 10. The preferred key device connection is via a PS-2 connector 12, although alternative connections, such as a Universal Serial Bus (USB) 14 and an Infra-Red (IR) port 16, can be used as described below. Although the security system has been designed for use with a notebook computer 10, it will be recognized that the system can be adapted for use with other computers, such as a desktops or Personal Digital Assistants (PDA).

Ideally, the key device 20 is of such shape and size as to be placed on the user's key chain. It receives power and command messages from the notebook computer 10 and returns response messages, a serial number and an encryption key. A program running on the notebook computer 10 uses the key device serial number and the encryption key in a user-validation procedure to prevent operation (i.e. power-up) of the note book computer 10 by an unauthorized user. For maximum security protection, the key device 20 is connected only during the user-validation procedure and is carried and stored separately from the notebook computer 10.

Figure 2:
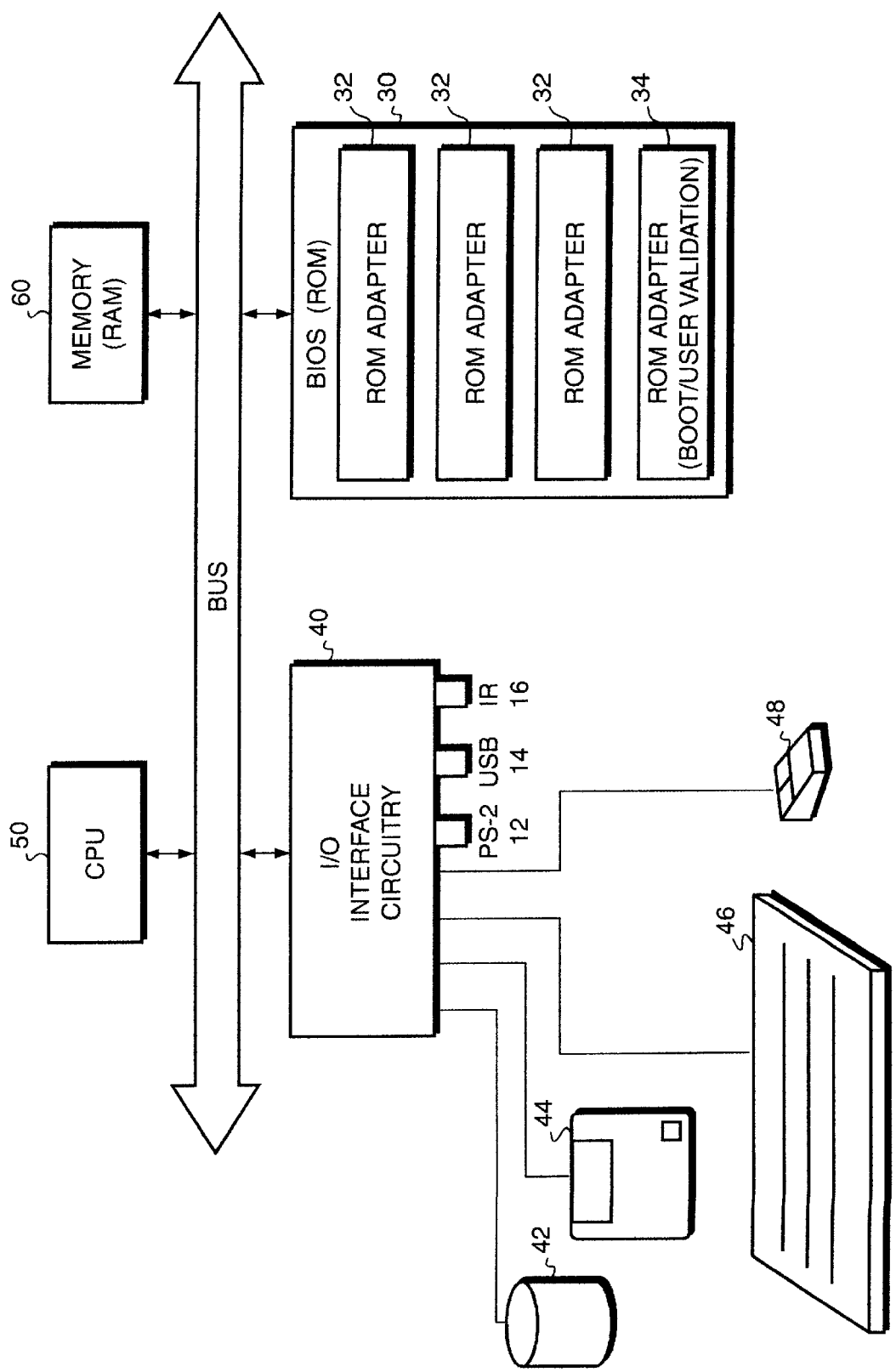
FIG. 2 is a block diagram of the major components within the CPU address space of an IBM-PC compatible computer.

FIG. 2 is a block diagram of the major components within the Central Processing Unit (CPU) 50 address space for a conventional IBM PC-compatible computer. At power-up, the CPU 50 accesses the Basic Input/Output System (BIOS) Read-Only Memory (ROM) 30 and executes a "boot-up" procedure. Prior to the termination of the boot-up procedure, the CPU downloads the operating system (OS) program via a memory-mapped interface 40 from a mass storage device, such as a hard drive 42 or possibly a diskette 44, and reads it into main Random-Access Memory (RAM) memory 60. In the preferred embodiment of the invention, the boot-up user-validation program resides in a ROM adapter 34 of the BIOS 30 and is executed at boot-up and prior to the download of the operating system.

Figure 3:
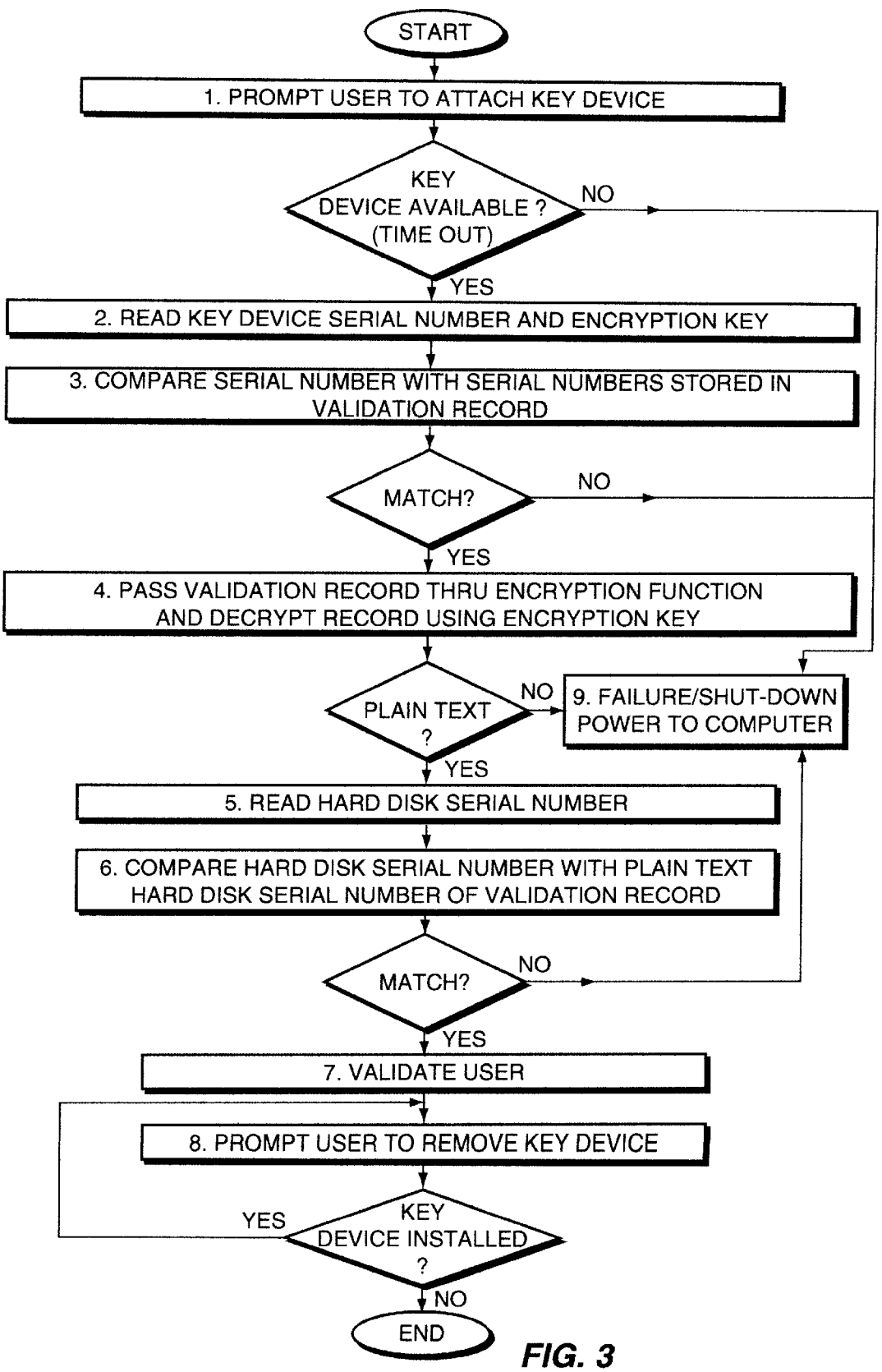
FIG. 3 is a flow diagram of the boot and user-validation procedure.

A flow diagram of the user-validation procedure is shown in FIG. 3. In Step 1, the user-validation program prompts the user to attach the key device 20 to the notebook computer 10. The program attempts to communicate with the key device 20 for a fixed delay period. If a key device 20 is not detected within this period, then the program proceeds to Step 9 where the computer is automatically powered down. In Step 2, the program reads the key device serial number and encryption key that are stored in the key device ROM 24. The key device serial number and encryption key, usually a large prime number, are loaded into the key device 20 by the manufacturer.

The protocol for interfacing the key device 20 to the computer 10 through a PS-2, USB or IR port is shown in FIG. 4. The first portion, shown in FIG. 4A, is the standard, or conventional, initialization protocol flow between the notebook computer 10 and either a keyboard 46 or a mouse 48. After power up or a reset (FF) command from the BIOS, the device will identify its type ("AA"=keyboard; "AA 00"=mouse). A read identification (F2) command is then issued and a keyboard 46, for example, will return an acknowledgment (FA) response and the "AB 41" identification number.

Figure 4A:
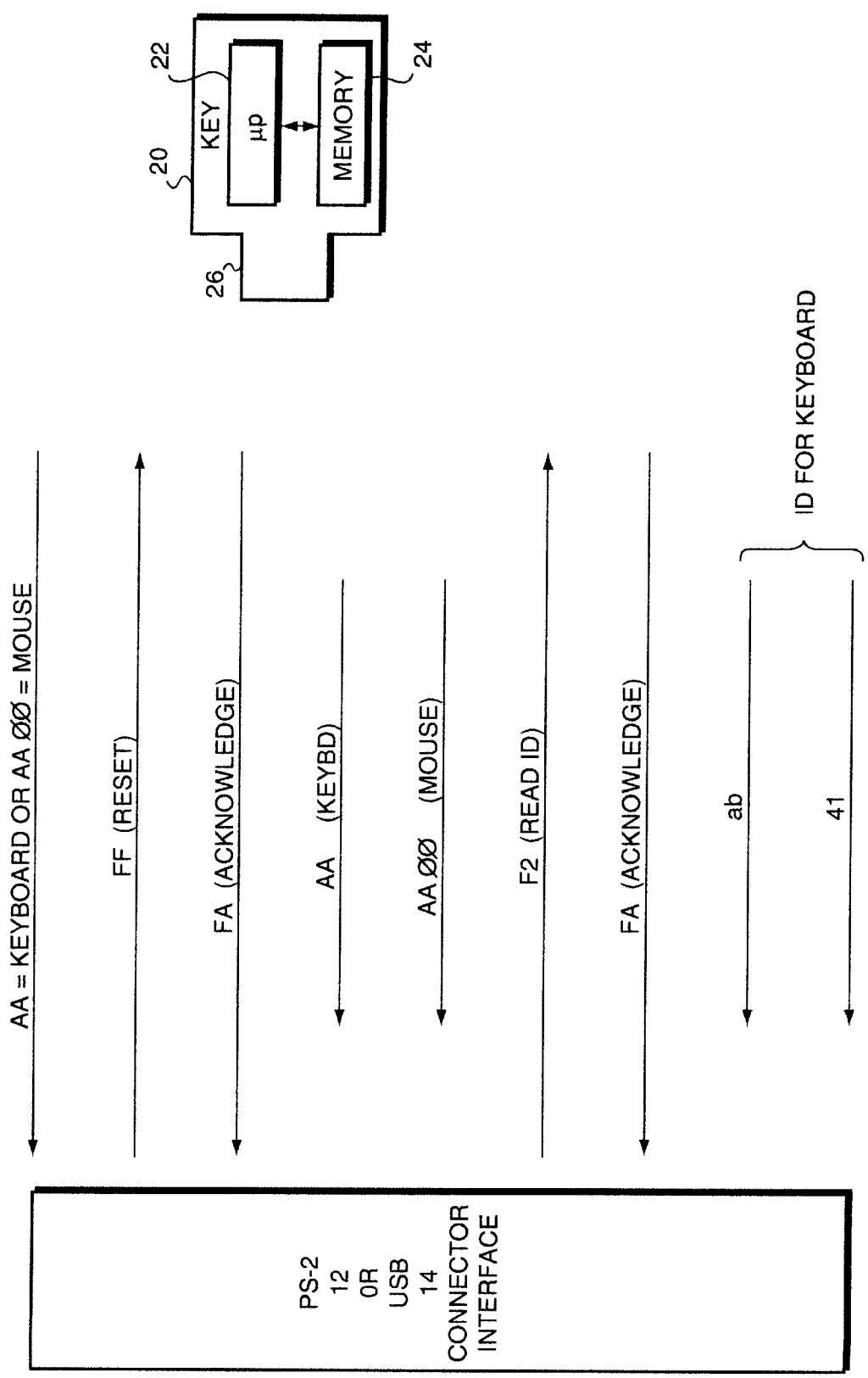
FIGS. 4A–4C depict the PS2/USB/IR interface protocol.
Figure 4B:
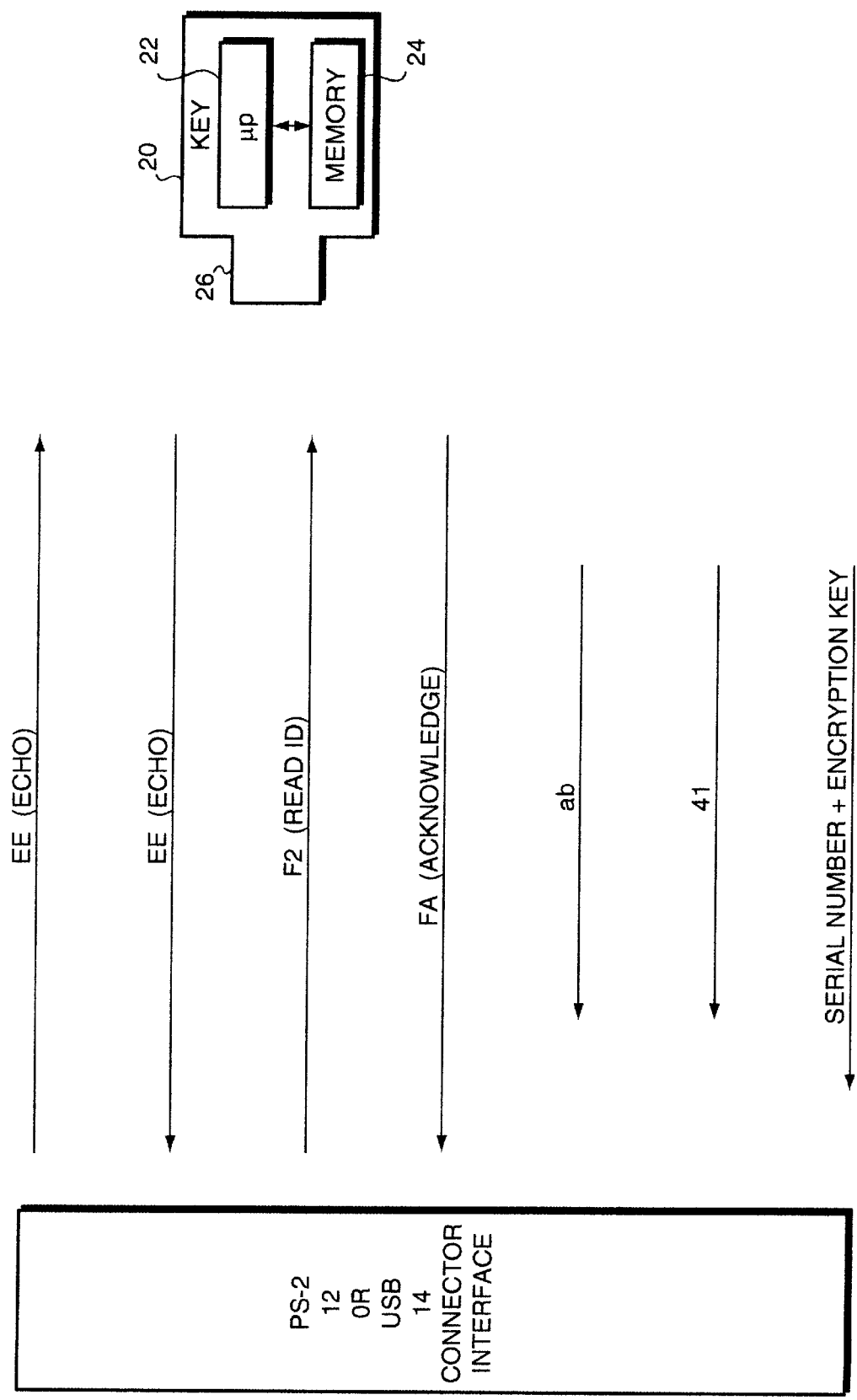

A novel protocol for reading the key device data through a PS-2 or USB port is shown in FIG. 4B. After the initialization protocol is executed, the key device 20 waits for a unique two-command sequence that it will recognize as the cue for sending the key device serial number and encryption key. For illustrative purposes, the sequence is shown as an echo (EE) command followed by a read identification (F2) command. The program sends an echo (EE) command to the key device 20. The key device 20 returns an echo (EE) response. After the echo test bits have been verified, the program issues a read identification (F2) command to the key device 20. The key device 20 returns an acknowledgment (FA) response and the "AB 41" identification number and further appends the key device serial number and encryption key. In this example, the key device 20 appends the serial number and encryption key only when the read identification (F2) command is immediately preceded by the echo (EE) command.

In Step 3, the program compares the key device serial number to the corresponding number in a set of stored validation records, one of which is maintained for each user. The records are stored in a reserved sector of the hard disk 42, or other mass storage device, preferably when the security system software is installed on the computer. Each validation record is comprised of the following fields:

FIELD 1—key device serial number (standard ASCII characters)
FIELD 2—internal device serial number (encrypted)
FIELD 3—level: user or supervisor (encrypted)
FIELD 4—user encryption keys (encrypted)
FIELD 5—user information (encrypted)

If the key device serial number received from the key device 20 does not match field 1 of any of the validation records, then the program proceeds to Step 9.

In Step 4, the program uses the encryption key to decrypt the encrypted portions of the validation record. If the decrypted record reads as plain ASCII text, the program moves to Step 5, otherwise, it proceeds to Step 9. At Step 5, the program reads the serial number of an internal device, preferably the hard disk 42. The retrieved serial number is compared to the plain text serial number of field 2 of the validation record. If the serial numbers match, the user has been validated. If the numbers do not match, the program moves to Step 9.

In Step 8, the program waits for the key device 20 to be disconnected from the notebook computer 10. It periodically executes the read protocol of FIG. 4B to determines whether the key device serial number and encryption key data are appended to the acknowledgment (FA) response. When the key device data is not appended to the acknowledgment (FA) response, the program terminates and normal computer operations can commence.

In a multiple user situation, a supervisor is designated by setting the single bit of field 3 of the validation record. If the bit is set, the supervisor can gain access to the users' encryption keys which are stored in field 4. The user information in field 5 holds user-specific data stored for informational purposes.

To provide protection against the copying of the serial number and encryption key data from the key device 20, a "super key" access code procedure may be programmed by the manufacturer into the key device 20, and a "super key" verification step may be inserted at the start of the user validation procedure. The access code procedure requires the key device 20 to verify receipt of a matching code number before it will output the serial number and encryption key data. Preferably, the access code "hops", or changes, each time the key device 20 is accessed.

Figure 4C:
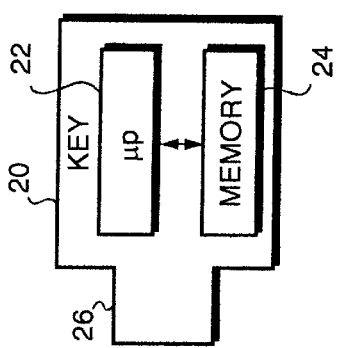
Figure 4C:
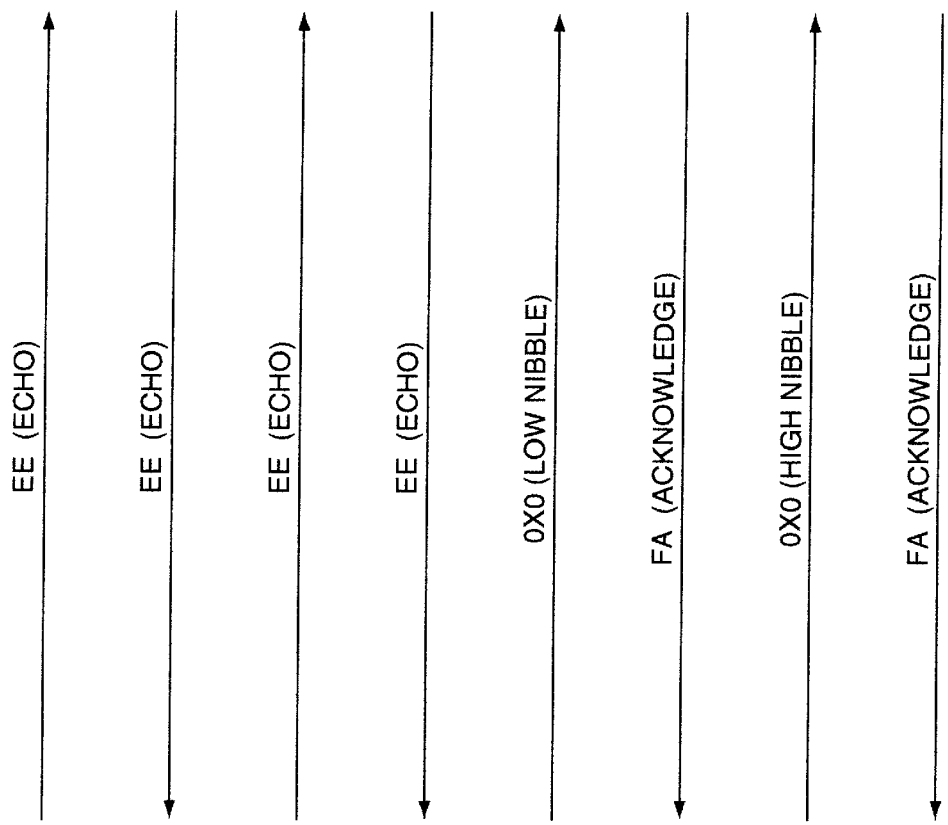
Figure 4C:
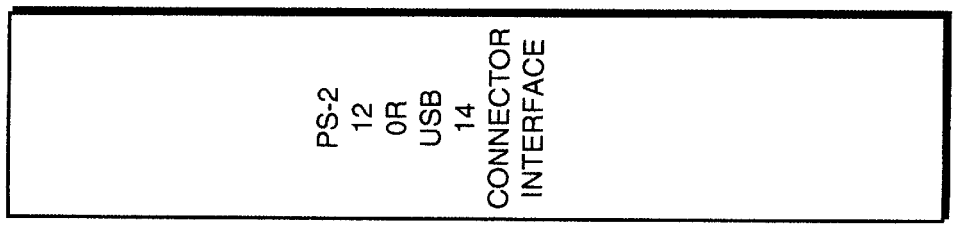
Figure 5A:
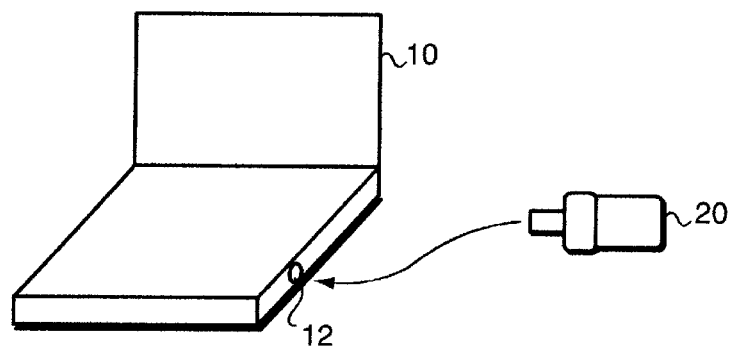
FIGS. 5A–5F illustrate various key device-to-computer interfaces.
Figure 5B:
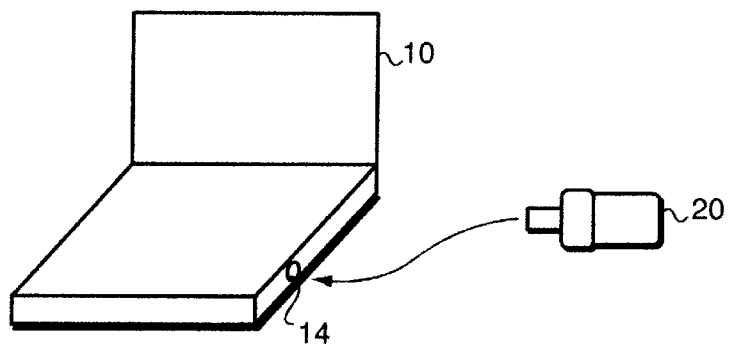
Figure 5C:
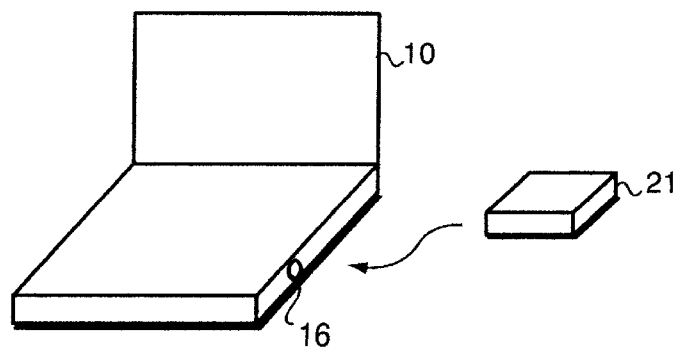
Figure 5D:
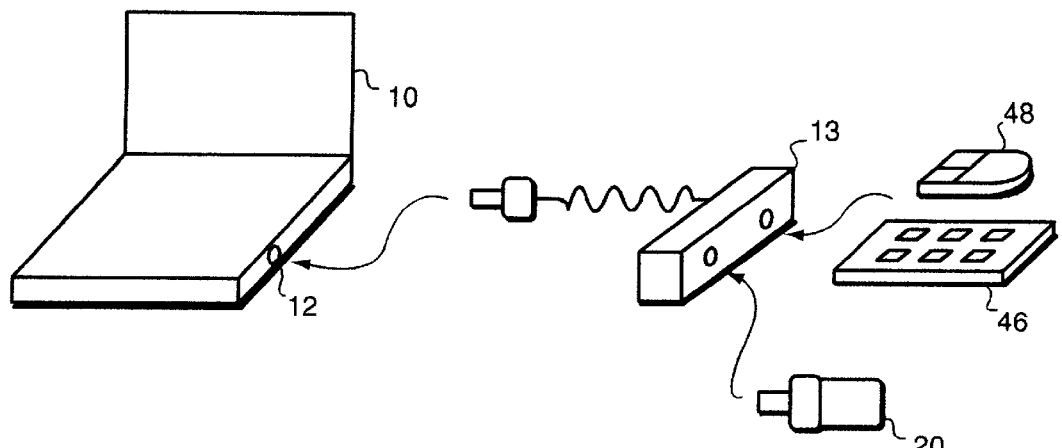
Figure 5E:
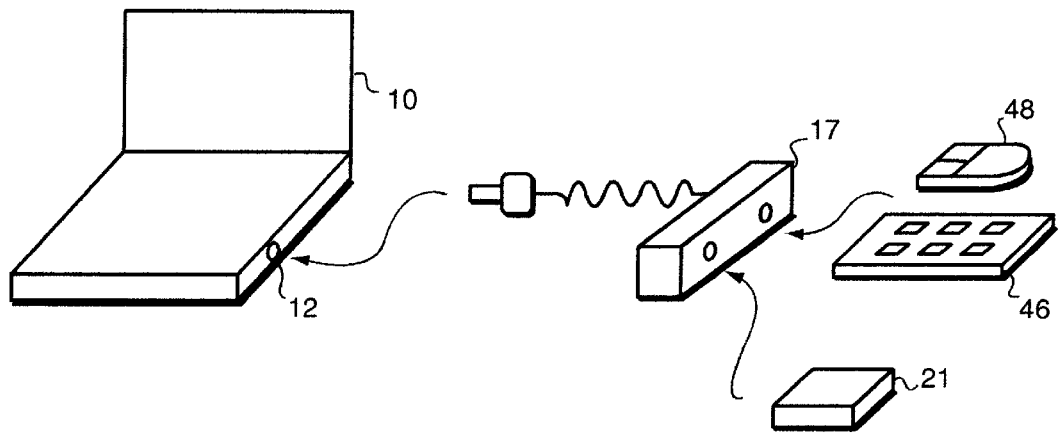
Figure 5F:
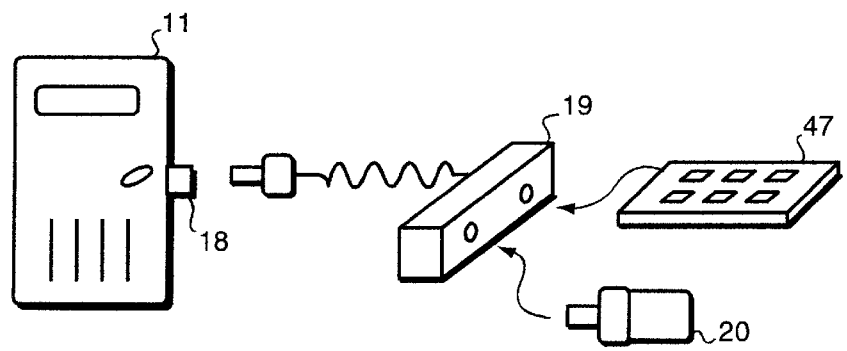

A novel protocol for writing data to the key device 20 through a PS-2, USB or IR port is shown in FIG. 4C. The write protocol is executed after the initialization protocol of FIG. 4A and prior to the read protocol of FIG. 4B. The key device 20 waits for a unique two-command sequence that it will recognize as the signal that the program is sending one byte of data. For illustrative purposes, the sequence is shown as two consecutive echo (EE) commands. After the echo test bits are verified, the program issues a low nibble (0X0; X=low nibble data) data message to the key device 20. The key device 20 returns an acknowledgment (FA) response. The program next issues a high nibble (0Y0; Y=high nibble data) data message to the key device 20 and the key device 20 again returns an acknowledgment (FA) response.

The "super key" access code number that is sent by the program to the key device 20 may be longer than one byte. The write protocol of FIG. 4C is repeated as necessary for each additional byte of data. The key device 20 microprocessor 22 concatenates the low and high nibbles and compares the resulting number to the access code number stored in its memory 24. If the numbers do not match, the key device 20 will not append the serial number and encryption key data to the acknowledgment (FA) response as shown in FIG. 4B.

Alternative physical connections can be employed to connect the key device 20 to a notebook computer 10 as shown in FIG. 5. Any serial or parallel port may be used, although the PS-2 and USB port connections, shown respectively in FIGS. 5A and 5B, are preferred because of their small size. In a third alternative, an IR key device 21 is equipped for Infra-Red (IR) communications with a notebook computer 10 via an IR port 16 as shown in FIG. 5C. In a fourth alternative, a special PS-2 "Y" connector 13, equipped with an internal automatic switch (not shown), is employed to permit the simultaneous PS-2 connection of a key device 20 and a keyboard 46 (or mouse 48) to a notebook computer 10 as shown in FIG. 5D. In a fifth alternative, a special PS-2/IR "Y" connector 17, equipped with an internal automatic switch (not shown), is employed to permit the simultaneous IR connection of an IR key device 21 and a keyboard 46 (or mouse 48) to a notebook computer 10 as shown in FIG. 5E. In a sixth alternative, the key device 20 is connected to the keyboard port 18 of a desktop computer 11 via a special AT "Y" connector 19, equipped with an internal automatic switch (not shown), that also permits the simultaneous connection of an AT keyboard 47 as shown in FIG. 5F.

The internal automatic switch (not shown) in each "Y" connector is controlled by an internal microprocessor (not shown). The switch is configured to be normally open at the key device port and normally closed at the "pass-through"

port of each "Y" connector. The microprocessor monitors the transmissions across the switch. When it detects the protocol command sequences described above, it temporarily switches the connection to the key device port and relays the command and response messages between the computer 10 and the key device 20. The switch automatically reverts back to pass-through mode when the computer 10/key device 20 communications are completed.

Alternate physical configurations of the key device 20 are also possible. The key device 20 may be implemented as a Personal Computer Memory Card Industry Association (PCMCIA) card, a floppy diskette, or by any other detachable means for providing a key device serial number and an encryption key to the notebook computer 10.

As an added feature of the invention, an application program that implements the user-validation procedure may be installed with the security system and, preferably, on a Microsoft Windows 95/98/NT/CE platform. The application will provide either (user selected) automatic hard disk lock-up or computer power-down that triggers during normal operation after expiration of a user-defined inactivity period. The application also supports manual initiation of lock-up or power-down. In cases where the ROM BIOS program is not installed, the application can be used to prevent unauthorized user access to the hard disk contents.

Figure 6:
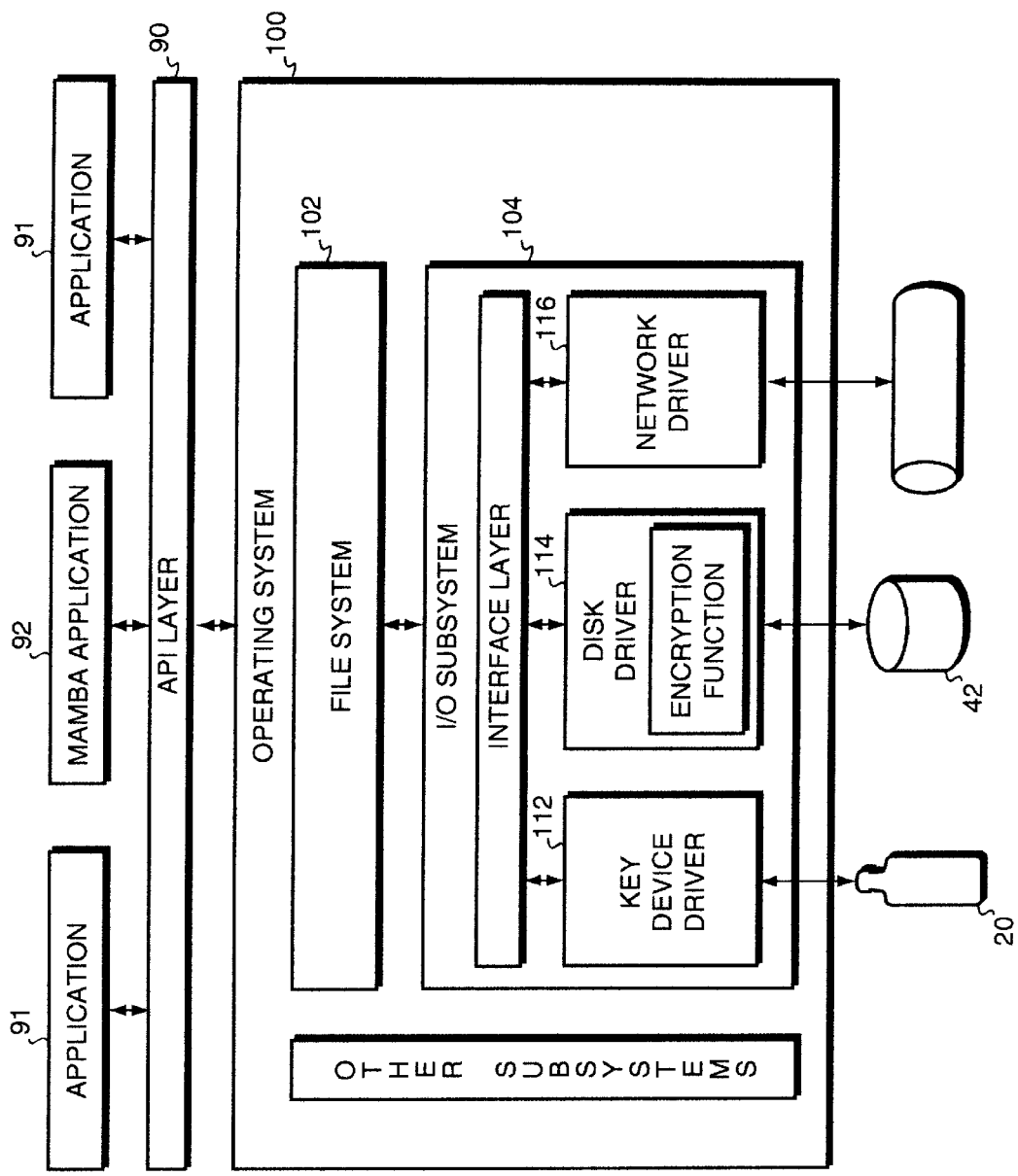
FIG. 6 is a block diagram of the software partitioning of an IBM-PC compatible computer.

To support the application on the Windows 95/98/NT/CE platform, an Operating System Interface (OSI) is provided. The application 92 is interfaced to the operating system 100 via an Application Program Interface (API) layer 90 as shown in FIG. 6. The OSI is comprised of two parts: the key device driver 112 and the OS visual interface. Within the I/O subsystem 104 an interface layer 1 10 supports various drivers, such as a disk driver 114, a key device driver 11 2, and a network driver 116. The key device driver 112 provides the application interface to the key device 20. It reads the key device serial number and the encryption key, matches the key device serial number to that of the validation record stored on the hard disk, and uses the encryption key to decrypt the encrypted portion of the validation record.

Figure 7:
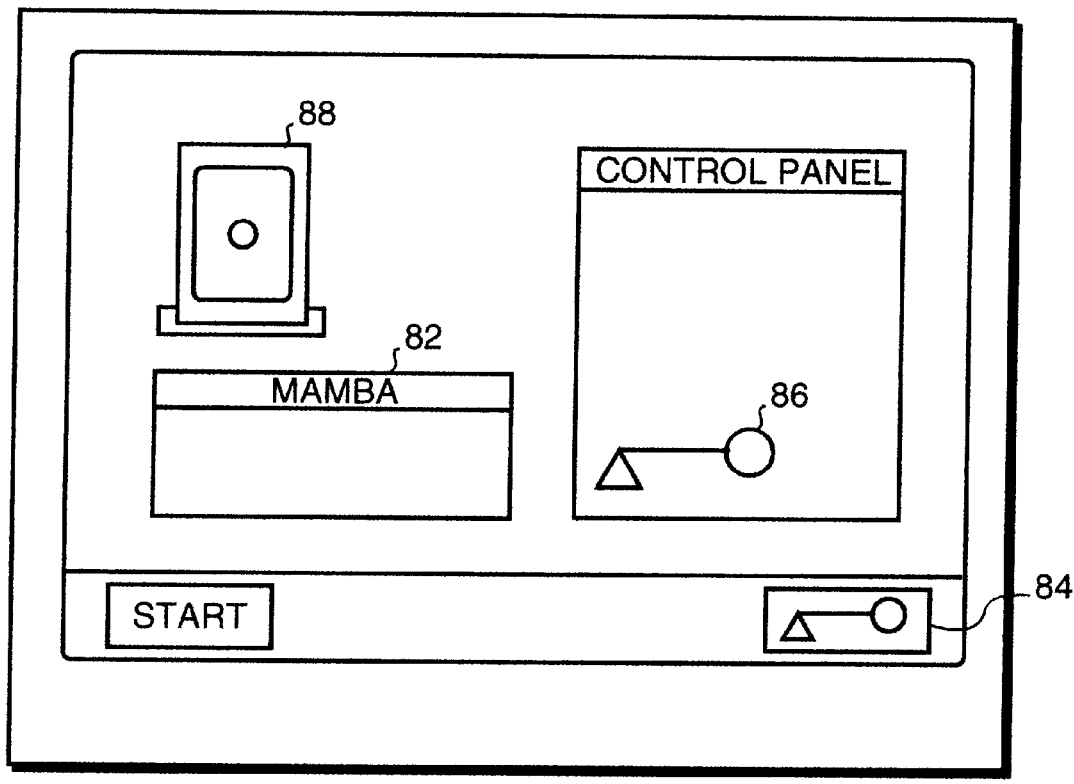
FIG. 7 is a depiction of the user screen of the user-validation program application.

An OS visual interface is illustrated in FIG. 7. The interface is comprised of a display window 82 for displaying messages to the user during the user-validation procedure or setting program parameters, a task bar "key" object 84 to either lock/unlock the hard disk or power-down the computer, a "key" icon 86 in the control panel for adjusting program parameters, and a "vault" object 88 to indicate whether the hard disk is locked or not (e.g. the vault door is either closed or open).

It is desirable that some form of warning label be applied to the exterior of the notebook computer 10 to deter a would-be thief. Such a practice is common with home burglary systems. The label should state that the computer is protected by a security system that will not permit operation without a special key device.

The utility of the invention is not limited to deterrence of computer hardware theft. For example, the key device 20 may also be used as a new and improved "dongle" for software copy protection. A dongle is a hardware security device that attaches to an I/O port, typically the parallel port, of a computer and contains a unique key number. To protect against software theft, third party applications 91 may require retrieval of a key, such as that stored in a dongle, to permit execution. With little or no modification, the key device 20 may be used as a dongle. In addition, software developers may incorporate into their applications the user validation procedure and PS-2/USB/IR communications protocols described above.

The foregoing has been limited to specific embodiments of this invention. It will be apparent, however, that variations and modifications may be made to the embodiments, with the attainment of some or all of their advantages. Therefore, it is the object of the appended claims to cover all such variations and modifications as come within the true spirit and scope of the invention.

What is claimed is:

1. A multi-level security system to prevent unauthorized use of a computer, said system comprising:
    a program resident on said computer and implementing a user-validation procedure;
    a key device to be inserted into the computer by the user to gain use of the computer, and carrying a first serial number and an optional encryption key;
    means for storing in said computer a second serial number, said second serial number being the serial number of a device internal to said computer;
    a mass storage device installed in said computer and storing a validation record; said validation record including an unencrypted portion and an encrypted portion, said unencrypted portion including a copy of said first serial number and said encrypted portion including a copy of said second serial number;
    means for interfacing said key device to said computer;
    a protocol initiated by said computer that is recognized by said key device to transmit said first serial number and said encryption key;
        means for reading said first serial number and said encryption key from said key device, and for matching the key device and the validation record, and means for allowing use of the computer only if said matching exists.

2. The system of claim 1 wherein the user-validation procedure comprises the steps of
    1. comparison of said first serial number from said key device to said copy of first serial number;
    2. decryption of said encrypted portion of validation record using said encryption key to produce a decrypted copy of the second serial number;
    3. comparison of said second serial number from said internal device to said decrypted copy of second serial number; and
    4. automatic power-down of said computer if said first serial number comparison and said second serial number comparisons are not matches.

3. The system of claim 1 wherein said user-validation procedure is performed by a program residing in a BIOS ROM adapter of said computer.

4. A multi-level security system to prevent unauthorized use of a computer, said system comprising,
    a program resident on said computer and implementing a user-validation procedure;
    a key device to be inserted into the computer by the user to gain use of the computer, and carrying an access code, a first serial number and an encryption key;
    means for storing in said computer a second serial number, said second serial number being the serial number of a device internal to said computer;
    a mass storage device installed in said computer and storing a validation record; said validation record comprising an unencrypted portion and an encrypted portion, said unencrypted portion including copies of said access code and said first serial number and said encrypted portion including a copy of said second serial number;

means for interfacing said key device to said computer;

means for writing said copy of access code to said key device comprising means for comparing said access code to said copy of access code; and means for reading said first serial number and said encryption key from said key device.

5. The system of claim 4 wherein the user-validation procedure comprises the steps of:

1. transmission of said copy of access code to said key device for access code verification;
2. transmission of said first serial number and said encryption key from said key device if said access code is verified;
3. comparison of said first serial number from said key device to said copy of first serial number;
4. decryption of said encrypted portion of validation record using said encryption key to produce a decrypted copy of the second serial number;
5. comparison of said second serial number from said internal device to said decrypted copy of second serial number; and
6. automatic power-down of said computer if said first serial number comparison and said second serial number comparisons are not matches.

6. The system of claim 4 wherein said user-validation procedure is performed by a program residing in a BIOS ROM adapter of said computer.

7. A multi-level security system to prevent unauthorized use of a computer, said system comprising:

a key device to be inserted into the computer by the user to gain use of the computer and carrying a first serial number;

a device installed in said computer and storing a validation record, said validation record having a copy of said first serial number;

an interface to connect said key device to said computer and to provide a pathway to read said first serial number;

a computer program to compare said first serial number from said key device to said copy of said first serial number; and, means for automatically powering down said computer if said first serial number and said copy of said first serial number do not match.

8. The security system of claim 7 further wherein:

said key device has an electrical contact interface to contact internals of the computer when inserted into the computer by the user to gain use of the computer and carries an encryption key;

said computer has a device to store a copy of a second serial number;

said validation record has an encrypted portion, said encrypted portion carrying an encrypted copy of said second serial number;

said computer program to decrypt said second serial number from said validation record using said encryption key, to produce a decrypted version of said second serial number, and to compare said decrypted version of said second serial number with said copy of said second serial number; and, means for automatically powering down said computer if said copy of said second serial number and said decrypted copy of said second serial number do not match.

9. A method for securing a computer comprising the steps of:

carrying a first serial number and an encryption key in a key device;

inserting said key device by a user into the computer to gain use of the computer;

storing a copy of a second serial number in a device in said computer;

storing a validation record in at least one storage device installed in said computer, said validation record having a copy of said first serial number, and having an encrypted version of said second serial number;

providing a pathway to read said first serial number and said encryption key through an interface connecting said key device to said computer;

comparing said first serial number from said key device to said copy of said first serial number;

decrypting said second serial number from said validation record using said encryption key, to produce a decrypted version of said second serial number;

comparing said decrypted version of said second serial number with said copy of said second serial number;

powering down said computer if said first serial number and said copy of said first serial number do not match; and, powering down said computer if said copy of said second serial number and said decrypted copy of said second serial number do not match.

10. The method of claim 9 further comprising:

carrying an access code in said key device (key device access code);

carrying a copy of said access code in said validation record (validation access code);

writing said validation access code to said key device, said key device comparing said key device access code to said validation access code; and, powering down said computer if said key device access code and said validation access code do not match.

* * * * *